Aug. 20, 1968   F. T. SPENCER   3,398,224
METHOD OF AND APPARATUS FOR PROVIDING A POLYURETHANE
FOAM WITH A DENSE SURFACE LAYER
Filed July 7, 1965

INVENTOR.
FRANCIS T. SPENCER
BY
Roberts Cushman & Grossman
ATTORNEYS

United States Patent Office 3,398,224
Patented Aug. 20, 1968

3,398,224
METHOD OF AND APPARATUS FOR PROVIDING A POLYURETHANE FOAM WITH A DENSE SURFACE LAYER
Francis T. Spencer, Biddeford, Maine, assignor to Pepperell Manufacturing Company, Boston, Mass., a corporation of Massachusetts
Filed July 7, 1965, Ser. No. 470,053
12 Claims. (Cl. 264—321)

ABSTRACT OF THE DISCLOSURE

Method of and apparatus for so treating commercial, fully cured polyurethane foam as to provide it on one face with a dense, integral surface layer or skin which is free from transverse wrinkles at its selvages and from longitudinal corrugations.

---

This invention pertains to the treatment of sheet foam material, especially polyurethane foam, so as to provide it with an integral, dense surface layer or skin by the application of heat and pressure—in particular, to provide foam material having a leather-like feel or appearance and which is useful for various purposes for which real leather has heretofore been employed—the present invention providing a novel method of and apparatus for use in preparing such material.

Many previous abortive attempts to produce such material have been made. Although it has heretofore been shown, experimentally, how to produce pieces of material a few inches square having the desired characteristics, so far as is known it has not previously been found possible to produce such material on a commercial and practical scale. The present invention has for its object the provision of a novel method and novel apparatus for carrying said method into effect whereby such material may be made on a mass production scale and at an acceptable cost and of a character such that it meets the requirements of a commercial substitute for genuine leather.

Among the difficulties heretofore encountered in the production of such material commercially has been that of producing a compressed foam which is uniform in thickness from one edge to the other of the sheet, this difficulty arising, in particular, from the fact that whatever material (necessarily, it appears, somewhat resilient) be selected for use in making the pressure-applying element, for example a roll, it must be such that it will not deteriorate rapidly when exposed to the elevated temperature, for example, a temperature within a range of from 500° F. and 590° F. which is necessary to soften the foam to the requisite amount. A further and even more serious difficulty arises from the fact that the sheet foam, as produced customarily, has wrinkles at frequent intervals in the selvage areas. If, during the formation of the skin, in accordance with any usual practice, the sheet of foam be compressed very substantially, the wrinkles at the selvage become more evident and this effect is still further accentuated when several layers of foam are being laminated together by pressure, particularly if the foam layers are of different thickness. Under such circumstances, because of the different behavior of foam plies of different thickness, it has been found substantially impossible to produce a multilayer material sufficiently free of imperfections to be saleable.

An object of the present invention is to provide a novel apparatus whereby the above difficulties are overcome and whereby even a foam ply of substantial thickness, for example ⅝ of an inch, or a multi-layer foam material can be formed having a smooth and relatively dense surface layer or skin and which is free of any appearance of wrinkles at its selvages.

A further object is to provide a novel method of and apparatus for producing material having the above desirable characteristics rapidly and cheaply on a commercial scale.

A further object is to provide apparatus for use in making such material whereby it is possible to vary the relative thickness of the spongy body ply or layer and the dense surface layer or skin.

In the attainment of the above objects, the present invention provides apparatus comprising a pair of treating rolls, one of which is desirably a metallic roll having a smooth peripheral surface with provision for heating it to a temperature, for example, within the range of 500° F. to 590° F.—against which the sheet foam is pressed by the other roll—the latter having a resilient peripheral surface, for example, of rubber, of a hardness of the order of from 75 to 80 Shore, and which is artificially cooled to a temperature below that at which the resilient surface material would be deteriorated by heat, and with means, for example springs or compressed air, for resiliently urging the cooled roll toward the heated roll, but with provision for adjustably limiting the approach of the rolls, and further comprising means, for example, a pair of feed rolls, one, at least, of which is driven at a predetermined speed, for advancing the sheet foam toward the bite of the treating rolls, the linear velocity of the feed rolls being such that the foam material which extends from the feed rolls to the treating rolls, is so tensioned and treated as to eliminate transverse wrinkles or longitudinal corrugations.

In the accompanying drawings the practice of the method of the present invention is illustrated by way of example and more or less diagrammatically by reference to novel apparatus useful for the purpose.

In the drawings—

Figure 5:
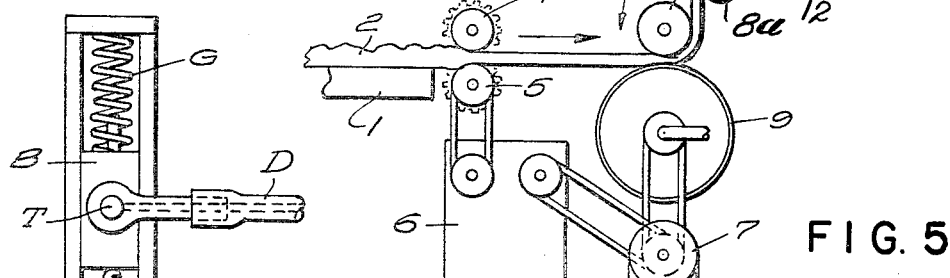
Figure 6:
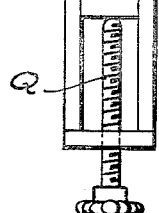

FIG. 5 is a small scale diagrammatic side elevation illustrative of a preferred procedure and showing the foam material advancing toward the feed rolls and from thence passing to the treating rolls and in somewhat exaggerated form illustrating the effect of driving the feed rolls at a lesser linear velocity than the treating rolls; and FIG. 6 is a fragmentary detail, in side elevation, showing one of the trunnions for the cooled roll.

Figure 2:
FIG. 2 is a fragmentary, diagrammatic plan view showing the appearance of commercial foam having wrinkles in its selvage portions.
Figure 3:
FIG. 3 is a section on the line 3—3 of FIG. 2.
Figure 4:
FIG. 4 is a longitudinal section through a piece of multi-ply foam material which has been prepared in accordance with the present invention.

Referring to the drawings and, in particular, to FIGS. 2 and 3, the character S indicates a length of commercial urethane foam (with its central area broken away) whose selvage portions S are shown as having irregular wrinkles W.

FIG. 5 diagrammatically suggests preferred apparatus, according to the present invention, for processing foam such as that of FIGS. 2 and 3, so as to provide a foam free from transverse wrinkles or longitudinal corrugations and which has been so treated as to densify the material at one face, at least, by heat treatment.

In this view (FIG. 5), the numeral 1 designates any suitable support, for example a rigid table having a smooth upper surface along which a length of sheet foam 2 of the commercial type, having occasional wrinkles in its upper surface, is advanced into the bite of a pair of feed rolls 4 and 5, the latter being shown as driven, for example, through an interposed speed-reducer 6 of commercial type from a motor 7—the speed-reducer 6 being of the type which permits desired adjustment of the linear speed of the driven roll 5. The foam material which emerges from between the rolls 4 and 5 advances into the bite of the treating rolls 8 and 9—the roll 8 being cool and the roll 9 being hot, the latter roll being driven at suitable linear velocity by the same motor 7—the linear velocity of this hot roll 9 somewhat exceeding that of the rolls 4 and 5 so that the material 10, intervening between the bites of the two pairs of rolls, is tensioned and somewhat reduced in thickness whereby the wrinkles are eliminated. When dealing with thick material, for example sheet foam of ⅝ of an inch or more in thickness and which has a tendency to develop longitudinally extending corrugations as it leaves the bite of the treating rolls, provision is made, as by the use of a roll 8a, for keeping several inches of the treated material in contact with the peripheral surface of the cool roll, for example through an arc of the order of 90° of the roll's circumference, a procedure whereby such corrugations are completely eliminated. The material 11 which emerges now has a relatively dense surface layer 12 resultant from the pressure of the foam material against the hot roll 9 and is free from transverse wrinkles or longitudinal corrugations.

Figure 1:
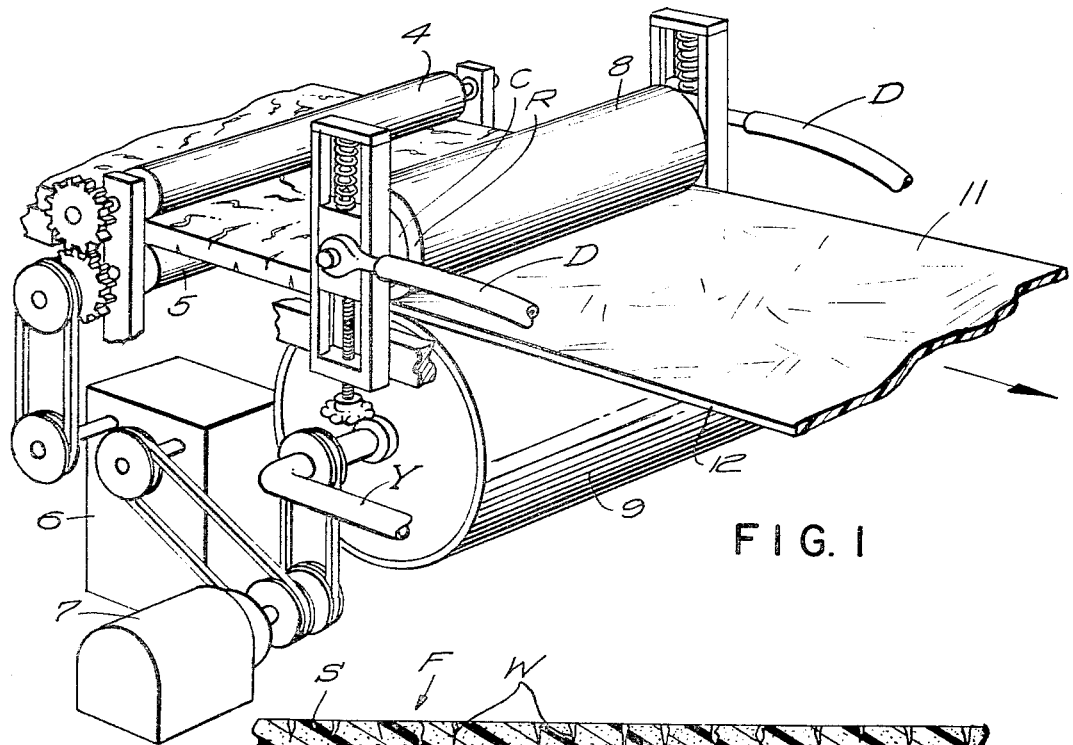
FIG. 1 is a fragmentary perspective view showing foam material of a conventional type passing between a pair of feed rolls on its way to a pair of treating rolls, and showing the completed, processed foam according to the present invention emerging from the latter rolls.

In FIG. 1 actual apparatus for carrying out the method shows the feed rolls 4 and 5 as gear-driven by a motor device 7 and speed-reducing annd speed-adjusting means of commercial type. The upper processing roll 8 is comprised of a hollow cylindrical core C, for example steel, and a jacket R of resilient material, for example rubber. This roll turns on tubular trunnions T (FIG. 6) which are supported in vertically slidable blocks B urged downwardly by springs G (only one of which is shown), or if desired, by compressed air in a suitable cylinder (not shown)—each block being limited in its downward movement by a manually adjustable stop screw Q, thereby to limit the approach of the roll 8 toward the roll 9. Suitable conduits D supply a cold fluid, for example cold water, to the interior of the hollow core R and its discharge from said core whereby the material of the jacket R is kept at a temperature below that which would cause deterioration.

The lower processing roll 9 is desirably of steel and is hollow and mounted upon hollow trunnions through which steam or hot oil is supplied to and discharged from the interior of the roll by pipes Y so as to maintain (for example, in response to a thermostat, not shown), the temperature of the smooth peripheral surface of this roll within a range of from 500° F. to 590° F. It will of course be understood that the temperature differential between the rolls 8 and 9 is subject to variation in accordance with the composition of the foam to be treated as well as the thickness of the sheet foam before treatment, and the amount of compression to which it is subjected during treatment. However, the compression and heat may be such as to produce only a relatively thin but dense layer 12 on one face of the material, leaving the major portion of the thickness of a density not substantially different from that of the original sheet. On the other hand, in the production of some artificial leathers, it may be desirable to reduce the thickness of the sheet very substantially as, for example, from an initial thickness of ⅝ of an inch to a thickness of 1/64 of an inch. Such a sudden reduction in thickness, where the area of contact of the sheet material with the rolls may not be more than one inch in width, would have a tendency to cause wrinkles in the material even though they did not initially exist.

In accordance with the present invention, the linear velocity of the processing rolls 8 and 9 is in excess of that of the feed rolls 4 and 5—the relative speeds being so predetermined as to eliminate wrinkles, initially present in the raw fabric and/or to prevent the formation of wrinkles, by the tensioning of the material in the interval between the bites of the two pairs of rolls.

The apparatus of FIG. 1 is wholly satisfactory for treating foam sheeting of the more usual thickknesses, for example, less than ⅝ of an inch thick, but for treating thicker material may be modified as above suggested and, as illustrated in FIG. 5, so as artificially to cool the material by keeping the foam in contact with the cool roll for an appreciable length of time immediately as it leaves the bite of the treating rolls. However, other and equivalent means may be provided for quickly cooling the material as it leaves the treating rolls.

While one desirable form of apparatus has here been illustrated and a desirable method of procedure has been described by way of example, it will be understood that this is primarily for illustrative purposes and that any equivalent means whereby the material is subjected to compression while in contact with a heated surface and longitudinally tensioned to eliminate wrinkles during its approach to the pressure-applying and heating means, is considered to fall within the scope of the invention as defined in the following claims.

I claim:

1. That method of treating foamed plastic thereby to provide it with an integral, non-porous skin upon one face which comprises as steps: contacting that face of the foam sheet which is to be densified with a hot, smooth metallic surface, applying pressure to the opposite face of the foam by means of a resiliently yieldable member while preventing the temperature of said member from rising above that temperature which would cause deterioration of the resiliently yieldable member, and maintaining the foam sheet under such tension as to eliminate wrinkles therefrom as it advances into the field of action of said pressure-applying member.

2. The method according to claim 1, wherein the hot surface is that of a rotating rigid roll and the cool surface is that of a rotatable roll whose peripheral surface is of rubber, and the sheet material is delivered to the bite of said rolls at a linear velocity, relative to the surface speed of said rolls, so that it is stretched sufficiently to eliminate wrinkles.

3. The method according to claim 2, wherein the temperature of the surface of the hot roll is within the range of from 500° F. and 590° F. and the temperature of the cool roll is lower than that which would deteriorate the rubber.

4. The method according to claim 1 which comprises the further step of artificially cooling the material immediately after application of heat.

5. The method according to claim 3, further characterized in constraining the material, as it escapes from the bite of the treating rolls, to remain in contact with the cool roll for a period of time such as to eliminate longitudinal corrugations.

6. Apparatus for use in processing raw sheet foam thereby to provide the foam with a relatively dense surface layer, said apparatus comprising processing means including an element having a smooth surface over which the material is moved, means for heating said element to a temperature such as to melt the foam which contacts it, a relatively cool pressure-applying member operative to press the foam into contact with said heated element, and means operative to tension the foam material as it is advanced into the field of action of the pressure-applying member thereby to eliminate wrinkles such as may be present in the raw material.

7. Apparatus according to claim 6, wherein the heated element is a hollow metal roll with means for supplying a hot fluid to and removing the fluid from the interior of the roll—the pressure-applying member being a hollow roll having a resilient peripheral surface with means for supplying a cold fluid to and removing it from the interior of said roll.

8. Apparatus according to claim 6, wherein the heated element is a hollow, cylindrical, metallic processing roll having means for rotating it, the cool pressure-applying member is a hollow processing roll whose effective pressure-applying peripheral surface is of a resilient material of a density of from 75 to 80 Shore; means for turning said rolls, and a pair of feed rolls for advancing the raw material toward the bite of the aforesaid rolls at such a linear velocity, relatively to that of the heated roll, as to tension the raw material sufficiently to eliminate wrinkles therefrom.

9. Apparatus according to claim 8, wherein the cool pressure-applying roll comprises a hollow core and a rubber peripheral jacket, the axis of said roll being parallel to that of the hot roll, means for limiting approach of the peripheral surface of the cool roll to the peripheral surface of the hot roll, and means resiliently urging the cool roll toward the hot roll.

10. Apparatus according to claim 8, comprising a pair of feed rolls between which the raw material must pass on its way to the processing means, and means for driving the feed rolls at such a linear velocity, relatively to that of the processing rolls, as to tension the raw material sufficiently to eliminate wrinkles therein before the material reaches the processing rolls.

11. Apparatus according to claim 6, further characterized in having means whereby the material is artifically cooled as it leaves the field of action of the heated element.

12. Apparatus according to claim 7, further characterized in having means for keeping the material in contact with a substantial arc of the periphery of the cooled roll after it leaves the bite of the processing rolls.

References Cited

UNITED STATES PATENTS

| 2,514,213 | 7/1950 | Mason et al. | 18—10 |
| 2,748,863 | 6/1956 | Benton. | |
| 3,104,192 | 9/1963 | Hacklander | 264—48 XR |

FOREIGN PATENTS

| 490,498 | 8/1938 | Great Britain. |
| 599,493 | 6/1960 | Canada. |

JAMES A. SEIDLECK, *Primary Examiner.*

P. E. ANDERSON, *Assistant Examiner.*